US010745575B2

(12) United States Patent
Becker et al.

(10) Patent No.: US 10,745,575 B2
(45) Date of Patent: Aug. 18, 2020

(54) METAL OFFSET PRINTING INK WITH SPECULAR GLOSS, AND PRINTING METHOD

(71) Applicant: ECKART GMBH, Hartenstein (DE)

(72) Inventors: Michael Becker, Hartenstein (DE); Dörte Reitzenstein, Hartenstein (DE); Alexandra Lindl, Hartenstein (DE); Yvonne Plitzko, Hartenstein (DE)

(73) Assignee: ECKART GMBH (DE)

( * ) Notice: Subject to any disclaimer, the term of this patent is extended or adjusted under 35 U.S.C. 154(b) by 184 days.

(21) Appl. No.: 15/774,199

(22) PCT Filed: Nov. 8, 2016

(86) PCT No.: PCT/EP2016/076951
§ 371 (c)(1),
(2) Date: May 7, 2018

(87) PCT Pub. No.: WO2017/080988
PCT Pub. Date: May 18, 2017

(65) Prior Publication Data
US 2018/0327616 A1 Nov. 15, 2018

(30) Foreign Application Priority Data
Nov. 9, 2015 (EP) .................... 15003202

(51) Int. Cl.
C09D 11/037 (2014.01)
C09C 1/64 (2006.01)

(52) U.S. Cl.
CPC ............. C09D 11/037 (2013.01); C09C 1/64 (2013.01); C01P 2006/22 (2013.01); C01P 2006/60 (2013.01); C09C 1/644 (2013.01)

(58) Field of Classification Search
None
See application file for complete search history.

(56) References Cited

U.S. PATENT DOCUMENTS

| 4,233,195 | A | | 11/1980 | Mills | |
| 4,321,087 | A | * | 3/1982 | Levine | B22F 9/12 |
| | | | | | 106/403 |
| 5,445,671 | A | * | 8/1995 | Herget | C09D 11/037 |
| | | | | | 523/171 |
| 6,398,999 | B1 | | 6/2002 | Josephy et al. | |
| 6,613,813 | B1 | * | 9/2003 | Borgmann | C09D 11/02 |
| | | | | | 523/160 |
| 7,166,331 | B2 | * | 1/2007 | Becker | C08G 18/4288 |
| | | | | | 427/384 |
| 10,407,572 | B2 | * | 9/2019 | Trummer | C09C 1/64 |
| 2001/0007696 | A1 | * | 7/2001 | Kaupp | C08K 9/02 |
| | | | | | 427/216 |
| 2007/0199478 | A1 | * | 8/2007 | Schlegl | A61K 8/26 |
| | | | | | 106/404 |
| 2008/0131383 | A1 | | 6/2008 | Kruger et al. | |
| 2010/0047199 | A1 | * | 2/2010 | Trummer | C09C 1/64 |
| | | | | | 424/61 |
| 2010/0064938 | A1 | * | 3/2010 | Voit | C09C 1/64 |
| | | | | | 106/287.1 |
| 2010/0279083 | A1 | * | 11/2010 | Trummer | C09C 1/642 |
| | | | | | 428/195.1 |
| 2011/0083582 | A1 | * | 4/2011 | Wagner | C09C 1/0081 |
| | | | | | 106/31.9 |
| 2011/0179971 | A1 | * | 7/2011 | Proelss | A61K 8/11 |
| | | | | | 106/31.65 |
| 2012/0135209 | A1 | * | 5/2012 | Becker | C09D 11/14 |
| | | | | | 428/207 |
| 2012/0274714 | A2 | * | 11/2012 | Prolss | C09C 1/64 |
| | | | | | 347/100 |
| 2015/0344716 | A1 | * | 12/2015 | Kroell | C09D 11/037 |
| | | | | | 106/31.65 |
| 2015/0344722 | A1 | * | 12/2015 | Lin | C09D 4/00 |
| | | | | | 428/412 |
| 2018/0058009 | A1 | * | 3/2018 | Richert | B41M 7/0081 |
| 2019/0390060 | A1 | * | 12/2019 | Trummer | C09C 1/646 |

FOREIGN PATENT DOCUMENTS

| DE | 102007036369 A1 | 2/2009 |
| DE | 102008029821 A1 | 12/2009 |
| DE | 102009037323 A1 | 2/2011 |
| EP | 0633299 A2 | 1/1995 |
| EP | 0826745 A2 | 3/1998 |
| EP | 0886671 B1 | 3/2001 |
| EP | 1338630 A1 | 8/2003 |
| EP | 2083052 A1 | 7/2009 |
| EP | 1613702 B1 | 10/2009 |
| EP | 2102294 B1 | 6/2012 |
| EP | 1621586 B1 | 11/2012 |

(Continued)

OTHER PUBLICATIONS

English translation of the International Search Report dated Feb. 10, 2017 for PCT/EP2016/076951; 3 pages.*

(Continued)

Primary Examiner — Helene Klemanski
(74) Attorney, Agent, or Firm — Fitch, Even, Tabin & Flannery, L.L.P.

(57) ABSTRACT

The invention relates to an offset printing ink containing platelet-shaped aluminum pigments with an average thickness $h_{50}$ ranging from 15 to 80 nm, binders, and solvents. The invention is characterized in that the platelet-shaped aluminum pigments are produced using a PVD method and are at least partly coated with a leafing additive, and the offset printing ink has a viscosity of 4 to 15 Pa s, measured on a sample which is temperature-controlled at 25° C. by means of a rotation viscometer with a cone/plate geometry under a shear stress of 185.9 Pa. The invention further relates to a method for producing a high-gloss printed metal image on a substrate, having the following steps: a) optionally applying a primer onto the substrate; b) applying an offset printing ink according to the invention onto the primer layer or onto the substrate, thereby forming a high-gloss printed layer B, and c) optionally applying additional color layers C onto the layer B.

22 Claims, No Drawings

(56) References Cited

FOREIGN PATENT DOCUMENTS

| | | |
|---|---|---|
| EP | 2746349 A1 | 6/2014 |
| JP | H734021 A | 2/1995 |
| JP | 2001146221 A | 5/2001 |
| JP | 2002114934 A | 4/2002 |
| JP | 2003049091 A | 2/2003 |
| JP | 2007021736 A | 2/2007 |
| JP | 4119594 B2 | 7/2008 |
| JP | 2009040809 A | 2/2009 |
| JP | 2015151522 A | 8/2015 |
| WO | WO 2005/049745 A1 * | 6/2005 |
| WO | 2013119387 A1 | 8/2013 |
| WO | WO 2016/156286 A1 * | 10/2016 |

OTHER PUBLICATIONS

English translation of the Written Opinion of the International Search Report dated Feb. 10, 2017 for PCT/EP2016/076951; 6 pages.*
MetalStar Super Gloss 07 Technical Product Information, Apr. 2012, www.totalgraphics.co.uk/downloads/supergloss877til2.pdf; 2 pages.*
Viscosity Conversion Table, coastisi.com/wp-content/uploads/pdfs/viscosity-conversion-table.pdf, no date available; 1 page.*
International Search Report for International Application No. PCT/EP2016/076951, dated Feb. 10, 2017, 15 pages.
Peter Wissling et al., "Metallic Effect Pigments", European Coatings Literature (2006) pp. 48-59.

* cited by examiner

METAL OFFSET PRINTING INK WITH SPECULAR GLOSS, AND PRINTING METHOD

The present invention relates to offset printing inks comprising metallic effect pigments with high specular gloss, to methods for producing the printing ink, and to methods for printing the offset printing ink.

Offset printing inks containing metallic pigment have been known for some considerable time. For example, JP 04119594 B2 and JP 2007021736 A disclose solvent-based offset printing inks which may include conventional aluminum effect pigments.

In contrast for example to flexographic inks, gravure inks or screen-printing inks, however, the known offset printing inks containing metallic pigment do not have very high specular gloss.

Quite unlike digital printing inks (inkjet) or flexographic inks, for example, offset printing inks feature a viscosity range which is higher by several orders of magnitude. The viscosity of offset printing inks comprising platelet-shaped aluminum pigments is typically situated within a range from 20 to 80 Pa s.

Inkjet printing inks typically have a viscosity in the region of just a few m Pa s. In the case of offset printing, the pathway for the applied printing ink from the cell to the print substrate is very long, and so it is not possible to set low viscosities. Viscosities that are too low in offset printing inks lead to unwanted drawbacks such as "misting", inadequate smear resistance, poor dot definition, or else unwanted dripping of the printing ink from the ink fountain.

WO 2013/119387 A1 discloses UV-curing offset printing inks which contain PVD metal pigments and have a relatively high gloss. These printing inks, however, cannot be used for conventional offset printing. A drawback of UV-curing inks is that in the case of incomplete polymerization, residues of toxicologically objectional monomers remain in the printed product. This goes against the increasing requirement for low-migration printing inks.

It was an object of the present invention to provide a conventional offset printing ink which has a metallic specular gloss improved over the prior art. The offset printing ink of the invention ought not to have any disadvantages in other properties relevant to its technical application. For example, effective printability and also overprintability ought to apply, and there should be no "misting".

A further object is to provide a method for producing the offset printing ink.

A further object is to provide a printed substrate having specular gloss.

A further object of the present invention is that of providing a printing method for generating a metallic mirror effect.

The objects stated have been achieved through provision of an offset printing ink comprising platelet-shaped aluminum pigments having an average thickness $h_{50}$ from a range from 15 to 80 nm, and also binders and solvents, characterized in that the platelet-shaped aluminum pigments are produced by PVD methods and are coated at least partly with a leafing additive, and in that the offset printing ink has a viscosity of 4 to 15 Pa s, measured on the sample conditioned at 25° C., using a rotational viscometer having a cone/plate geometry at a shear stress of 185.9 Pa.

Preferred embodiments of the offset printing ink are described below:

The solvent content may be in a range of 40-72 wt %, based on the overall offset printing ink.

The solvent may be one or more of mineral oils, vegetable oils, and fatty acid esters, or mixtures thereof, the vegetable oils not being used without at least one of the other two solvents.

The viscosity may be in the range from 4.1 to 12 Pa s, preferably 4.0 to 9.2 Pa s.

The leafing additive may be a phosphorus containing organic compound which is:
a) phosphoric acids or phosphoric esters having the general formula (I)

and/or
b) phosphonic acids or phosphonic esters of the general formula (II)

and/or
c) phosphinic acid or phosphinic esters of the general formula (III)

wherein
$R^1$, $R^2$ and $R^3$ independently of one another is H or a branched or unbranched alkyl, aryl, alkylaryl or arylalkyl group having 1 to 30 carbon atoms and optionally containing heteroatoms such as O, S, and/or N, with the proviso that in the case of a compound of the formula (I), at least one of these radicals is a branched or unbranched alkyl, aryl, alkylaryl or arylalkyl group having 8 to 30 carbon atoms,
$R^4$ and $R^5$ independently of one another is a branched or unbranched alkyl, aryl, alkylaryl or arylalkyl group having 8 to 30 carbon atoms and optionally containing heteroatoms
such as O, S, and/or N,
or
is a compound of the general formula (IV)

wherein $R^6$ is an aliphatic, preferably unbranched, alkyl radical having 12 to 30 carbon atoms and wherein X is a carboxyl group or a carboxylate group, an amino group or a trialkoxysilane.

In the above, $R^4$, $R^5$, and $R^6$ independently of one another may be branched or unbranched alkyl, aryl, alkylaryl or arylalkyl group having 14 to 20 carbon atoms.

The leafing additive may be
i) a phosphonic acid, where $R^1=R^2=H$ and $R^4$ is a branched or unbranched alkyl, aryl, alkylaryl, or arylalkyl group having 8 to 18 carbon atoms or
ii) a phosphoric ester, wherein at least one of the radicals $R^1$, $R^2$ and $R^3$ is a branched or unbranched alkyl group having 8 to 18 carbon atoms; or
iii) selected from the group consisting of stearic acid, ammonium stearate, alkali metal stearate, alkaline earth metal stearate or mixtures thereof.

The level of pigmentation of the aluminum pigment may be from 2 to 8 wt %, preferably 2.5 to 6 wt %, based in each case on the overall weight of the offset printing ink.

The binder may be selected from the group consisting of alkyd resins, modified rosins, maleate resins, aromatic hydrocarbon resins, modified hydrocarbon resins, allyl esters of polybasic organic acids, polyallyl ethers and mixtures thereof.

The ink may include further additives such as dryers, waxes, film-forming assistants, dispersing assistants, antioxidants and mixtures thereof.

The average sized $d_{50}$ of the PVD aluminum effect pigments may be in a range from 4 to 15 µm.

The stated object has additionally been solved by provision of a method for producing an offset printing ink of the invention, wherein the method comprises the following steps:

a) providing an offset varnish by mixing and heating binders and solvents, b) providing a paste with PVD aluminum effect pigments which have an average thickness $h_{50}$ of 15 to 80 nm and are coated with a leafing additive, c) adding further solvents and optionally further additives to the varnish a) and carrying out mixing with the PVD aluminum pigment paste b)

d) setting the viscosity in a range from 4 to 15 Pa s, wherein the viscosity is set preferably by addition of solvent, and wherein the viscosity is measured on the sample conditioned at 25° C. using a rotational viscometer having a cone/plate geometry at a shear stress of 185.9 Pa, d) optionally ageing the offset printing ink until it has attained a viscosity in a range from 4.0 to 12 Pa s.

The stated object has additionally been achieved through provision of a printed substrate with metallic specular gloss, comprising a) optionally a primer layer A, b) a layer B applied by offset printing using an offset printing ink of the invention, applied where appropriate on the primer layer A, c) optionally the further color layers C.

In preferred embodiments:

A primer layer may be applied the substrate. The primer layer may be a translucent layer.

A further color layer C may be applied which is transparent or comprises chromatic pigments.

Lastly, the stated object has been achieved through provision of a method for producing a printed substrate with metallic specular gloss, comprising the following steps:

a) optionally applying a primer to the substrate, b) applying an offset printing ink of the invention to the primer layer or to the substrate, to form a high-gloss print layer B, c) optionally applying further color layers to the layer B.

In preferred embodiments of this method:

A primer may be applied.

The layer B may be applied only once in the printing procedure.

The color layer C may be applied in a first printing by printing in line in one pass using an offset printing inking unit or a subsequent flexographic inking unit, or in that the color layer C is alternatively applied by any other printing method in offline mode in a second pass after drying of the first printing.

The invention pertains to an offset printing ink comprising platelet-shaped aluminum pigments having an average thickness No from a range from 15 to 80 nm, and also binders and solvents, characterized in that the platelet-shaped aluminum pigments are produced by PVD methods and are coated at least partly with a leafing additive, and in that the offset printing ink has a viscosity of 4 to 15 Pa s, measured on the sample conditioned at 25° C., using a rotational viscometer having a cone/plate geometry at a shear stress of 185.9 Pa.

It has been found, entirely surprisingly, that the offset printing inks of the invention have very low viscosities, which are normally not customary in offset printing and especially in the case of offset printing inks pigmented with metallic effect pigments. Offset printing inks have the reputation of being decidedly viscid, since in offset printing the path travelled by the printing ink from the ink fountain to the printed image is very long. Only with these low-viscosity offset printing inks has it been possible to achieve a satisfactory specular gloss. The disadvantages commonly touted in the prior art for low-viscosity of offset printing inks, however, such as "misting", inadequate smear resistance, poor dot definition or else unwanted dripping of the ink from the ink fountain, have not, surprisingly, been confirmed. The offset printing inks of the invention have a viscosity from a range from 4 to 15 Pa s, preferably from a range from 4.1 to 12 Pa s, more preferably from a range from 4.2 to 11 Pa s, very preferably from a range from 4.3 to below 10 Pa s and especially preferably from a range from 4.4 to below 9.5 Pa s. Further-preferred viscosity ranges are 4.0 to 9.2 Pa s and 4.0 to 9.0 Pa s.

The viscosity here is measured preferably using a rotational viscometer (model: Bohlin CVO 100, Malvern Instruments) with a cone/plate geometry (cone inclination angle: 4°, cone diameter: 40 mm) at a sample temperature of 25° C. The viscosity value used here is the value at a shear stress of 185.9 Pa.

Above a viscosity of 15 Pa s, it has not been possible to achieve high-gloss proof prints having the desired mirror effect. Below a viscosity of 4.0 Pa s, conversely, the phenomenon known as "misting" occurs. This involves the detachment of very small particles of printing ink during rotation of the rolls of the printing machine, and their dispersal in the form of an ink mist in all directions, leading to fouling of the printing machine. Further possible consequences are a severe reduction in dot definition and an insufficient smear resistance.

The skilled person could not have expected, in this low viscosity range, to obtain offset printing inks, pigmented with metallic effect pigments, which have flawless processing qualities and which exhibit the high mirror effect.

For the purposes of this invention, the viscosity of the offset printing ink of the invention is taken to be the viscosity possessed by the printing ink prior to printing. In the case of products supplied commercially, this will frequently be a printing ink which has already been aged for a certain time—two to four weeks, for example—following its production, since the printing ink must first be transported and may have to spend time in storage before being used.

The offset printing inks of the invention surprisingly exhibit a decrease in their viscosity after production over time. A constant viscosity is typically achieved after around one to two weeks.

This is fairly unusual for effect offset printing inks pigmented with metallic pigments, since normally a certain increase in the viscosity over time is observed.

For the platelet-shaped aluminum pigments it is essential to the invention that the pigments are produced by PVD methods. With this method, aluminum vapor is applied under ultra high vacuum to a polymer strip, typically a PET strip, which has been provided beforehand with a release coat. The metallized film in a stripping chamber is transferred into a solvent lane under atmospheric pressure. This detaches it from the polymeric substrate, and it is comminuted. By means of a subsequent mechanical treatment, the comminution is adjusted in a forced and controlled way for desired pigment sizes.

Aluminum pigments produced in this way have the highest optical rating on account of their extremely smooth surface and also of the straight cut edges which are generated during comminution and which offer incident light little scope for unwanted scattering effects. It has emerged that only the presence of these pigments is able to impart the desired mirror effect in the offset printing inks of the invention.

While success has since been achieved in producing, including by wet milling, aluminum effect pigments which have the average thicknesses and in some cases even the thickness distributions of the PVD pigments (EP 2102294 B1, EP 1613702 B1, EP 1621586 B1), these metallic effect pigments on their own have not proven suitable enough for the offset printing ink of the invention.

The average thickness $h_{50}$ of the PVD aluminum effect pigments is in a range from 15 to 80 nm, preferably in a range from 20 to 50 nm and very preferably in a range from 25 to 40 nm. Below 15 nm, the pigments become increasingly transparent and dark, which is detrimental to the desired mirror effect. Above 80 nm the pigments lack optimum orientation, again resulting in reduced gloss values.

The average pigment thickness is measured by counting in an SEM. Details of the measurement method could be found in EP 1613702 B1 (paragraphs [0125] and [0126]). The $h_{50}$ value here is the value of the cumulative thickness distribution for which 50% of all the particles lie below these thicknesses.

In detail, the determination of the average thickness $h_{50}$ in an SEM takes place with the aluminum pigments, present in each case as a paste or filter cake, being first washed with acetone and then dried out.

A resin customary in electron microscopy, for example TEMPFIX (Gerhard Neubauer Chemikalien, D-48031 Münster, Germany), is applied to a sample plate and heated on a hot plate until it softens. The sample plate is then removed from the hot plate and the respective aluminum powder is scattered onto the softened resin. As a result of the cooling, the resin resolidifies and the scattered aluminum pigments can be prepared in a manner in which they are fixed on the sample plate, standing nearly vertically—owing to the interaction between adhesion and gravity. As a result, the pigments are amenable to measurement from the side in an electron microscope. For the measurement of the thickness, an estimation is made of the azimuthal angle $\alpha$ of the pigment to a plane normal to the surface, and this angle is included in the thickness evaluation according to the formula $h_{eff}=h_{meas}/\cos \alpha$. The cumulative distribution curve was produced from the $h_{eff}$ values on the basis of the relative frequencies. At least around 100 particles are counted.

The average sizes $d_{50}$ of the PVD aluminum effect pigments are in a range from 4 to 15 μm, preferably in a range from 5-13 μm and more preferably in a range from 5.5-11 μm and very preferably in a range from 7.5 to 11 μm. Aluminum effect pigments with a $d_{50}$ value above 15 μm do not exhibit sufficient transfer during offset printing, while aluminum effect pigments having a $d_{50}$ value below 4 μm produce an optical effect which is too dark, and which is no longer specular gloss. The $d_{50}$ values are determined by means of the customary laser granulometry, using preferably a Cilas 1064 (Quantachrome) instrument for measurement.

The PVD pigments are available commercially in the form of dispersions with a pigment content of 10 to 20 wt %. They are available, for example, under the following trade names: Metalure® (from Eckart America), Starbrite® (from Silberline) and Decomet® (from Schlenk).

The PVD aluminum pigments may be provided with further coatings such as metal oxides, for example. Preference is given to coating with $SiO_2$, which as well as improved corrosion prevention may also act as an anchor layer for the modification of the pigment surface with leafing additives, preferably with long-chain organosilanes.

The level of pigmentation by the aluminum pigments in the printing ink is 2 to 8 wt %, preferably 3 to 7 wt % and more preferably 4 to 6.5 wt %, based in each case on the total weight of the offset printing ink.

Below 2 wt %, the hiding power of the aluminum pigments is not sufficient, thus greatly lowering the metallic effect. Above 8 wt %, the orientation of the effect pigments in the printed offset printing ink is disrupted by increasing spatial concentration and mutual spatial hindrance of the pigments with one another. A highly reduced gloss is the consequence here.

The offset printing ink of the invention preferably contains no further effect pigments such as pearlescent pigments and/or interference pigments. The addition of further effect pigments such as pearlescent pigments, for example, would considerably diminish the desired specular gloss. With preference the offset printing ink of the invention contains no pearlescent pigments.

It is true that the addition of chromatic pigments, depending on their transparency, would result in a reduced specular gloss. Moreover, there would be no strong coloring effect, since on account of their leafing, the aluminum effect pigments would largely eclipse the chromatic pigments in the print. It may, however, be desirable to obtain a colored print with considerable metallic effect by addition of suitable, preferably transparent, chromatic pigments. For example, by adding suitable yellow and/or red transparent chromatic pigments, a golden, strongly metallic print can be produced.

A further suitable pigment addition is, preferably, the admixing of conventional aluminum pigments produced by wet milling. In this case the pigments ought preferably to have an average thickness in a range from 15-80 nm and more preferably from 20 to 50 nm. The production of such pigments has been described in EP 2102294 B1, EP 1613702 B1 or EP 1621586 B1, which are hereby incorporated by reference.

The amount of this pigment addition ought not to exceed 40 wt %, preferably 20 wt % and more preferably 10 wt %, based on the total amount of the aluminum pigments.

In further-preferred embodiments, the offset printing ink of the invention contains no addition of conventionally milled aluminum pigments.

Subject-matter of the invention are oil-based offset printing inks. The offset printing inks of the invention are not UV-curable. They contain largely no monomers, preferably no monomers, which may represent an odor nuisance and a hazard to health.

The solvent for the offset printing inks of the invention are from the group consisting of mineral oils, vegetable oils, and fatty acid esters, or mixtures thereof. Here, however, vegetable oils are not used without at least one of the other two solvents in each case.

Suitable vegetable oils are oils and polyester derived therefrom that are based on linseed oil, soybean oil, sunflower oil, corn germ oil, grape oil, safflower oil, tall oil, cottonseed oil, castor oil, tung oil, oiticica oil or perilla oil, or mixtures thereof.

It is also possible to use synthetic vegetable oils, of the kind disclosed in EP 0 886 671 B1, for example.

Fatty acid esters are compounds of mono-, di- or triglycerides and long-chain fatty acids. Preferred fatty acid esters are those where the fatty acids used have a carbon length of 6-26 carbon atoms. The fatty acids may be saturated or unsaturated fatty acids. Examples of fatty acids are as follows: octanedecenoic acid, linoleic acid, linolenic acid, eleastearic acid, tetradecenoic acid, hexadecenoic acid, octanedecanoic acid, arachidic acid, dodecanoic acid, hexanoic acid, octanoic acid, decanoic acid, and dodecenoic acids.

Examples of fatty acid esters which can be used are isopropyl laurate (IPL) or pentaerythritol tetraoctoate (PTO).

In preferred embodiments the offset printing inks in accordance with the invention are suitable for food contact. In the case of these embodiments, however, the solvents do not include mineral oils; the solvent is instead a mixture of vegetable oils and fatty acid esters.

The solvent content of the offset printing inks of the invention is in a range from 40 to 72 wt % and preferably in a range from 43 to 68 wt % and very preferably in a range from 45 to 60 wt %, based in each case on the overall offset printing ink.

A suitable leafing additive in accordance with the invention is in principle any compound capable of generating a leafing effect on the part of the aluminum pigments in an offset print. Leafing is understood customarily as the floating of the platelet-shaped aluminum pigments in the application medium. As a result of the accumulation of the surface, there is a very good plane-parallel orientation of the aluminum pigments in the print, enabling a high gloss.

The leafing additive is preferably a phosphorus-containing organic compound which to be
a) phosphoric acids or phosphoric esters having the general formula (I)

$$(O)P(OR^1)(OR^2)(OR^3) \tag{I}$$

and/or
b) phosphonic acids or phosphonic esters of the general formula (II)

$$(O)PR^4(OR^1)(OR^2) \tag{II}$$

and/or
c) phosphinic acid or phosphinic esters of the general formula (III)

$$(O)PR^4R^5(OR^1) \tag{III}$$

In these formulae, $R^1$, $R^2$ and $R^3$ independently of one another are H or a branched or unbranched alkyl, aryl, alkylaryl or arylalkyl group having 1 to 30 carbon atoms and optionally containing heteroatoms such as O, S, and/or N, with the proviso that in the case of a compound of the formula (I), at least one of these radicals is a branched or unbranched alkyl, aryl, alkylaryl or arylalkyl group having 8 to 30 carbon atoms. Particularly preferred are branched or unbranched alkyl radicals without heteroatoms.

$R^4$ and $R^5$ independently of one another are a branched or unbranched alkyl, aryl, alkylaryl or arylalkyl group having 8 to 30 carbon atoms and optionally containing heteroatoms such as O, S, and/or N. Particularly preferred are branched or unbranched alkyl radicals without heteroatoms.

Moreover, the leafing additives may be a compound of the general formula (IV)

$$R^6-X \tag{IV}$$

wherein $R^6$ is an aliphatic, preferably unbranched, alkyl radical having 12 to 30 carbon atoms and wherein X is a carboxyl group or a carboxylate group, an amino group or a trialkoxysilane.

With particular preference, in compounds of the formulae (II), (III) or (IV), the leafing additives are
$R^4$, $R^5$ and $R^6$ independently of one another is a branched or unbranched alkyl, aryl, alkylaryl or arylalkyl group having 14 to 20 carbon atoms. With particular preference here the radicals $R^4$, $R^5$ and $R^6$ independently of one another are a branched or unbranched alkyl group having 14 to 20 carbon atoms.

In further preferred embodiments, the leafing additive:
i) is a phosphonic acid, where $R^1=R^2=H$ and $R^4$ is a branched or unbranched alkyl, aryl, alkylaryl or arylalkyl group having 8 to 18 carbon atoms
or
ii) is a phosphoric ester wherein at least one of the radicals $R^1$, $R^2$, and $R^3$ is a branched or unbranched alkyl group having 8 to 18 carbon atoms
or
iii) is a carboxylic acids of the formula (IV) which the group consisting of stearic acid, ammonium stearate, alkali metal stearate, alkaline earth metal stearate or mixtures thereof.

As phosphorus-containing leafing additives it is possible for example to use the following: octadecyl ester of phosphoric acid (Hordaphos MDST, Clariant), monocetyl phosphate (Hostaphat CC 100), stearylphosphonic acid, laurylphosphonic acid, octanephosphonic acid or mixtures thereof.

As carboxylic acids, preference is given to using stearic acid. Silanes used with preference are Dynasylan 9116, Dynasylan OCTEO or Dynasylan OCTMO (from Evonik).

In the context of this invention, the term "binders" refers to those resins which bring about the drying and solidification of the metallic effect pigment printing ink. The oil-type solvents are not included here.

The binder of the offset printing ink of the invention preferably comprises alkyd resins, modified rosins, maleate resins, aromatic hydrocarbon resins, modified hydrocarbon resins, allyl esters of polybasic organic acids, polyallyl ethers and mixtures thereof. With regard to modified hydrocarbon resins, particular preference is given to aromatically modified hydrocarbon resins.

Allyl esters of polybasic organic acids and polyallyl ethers are described in EP 0 886 671 B1, which is hereby incorporated by reference. These binders are especially suitable for formulating low-migration offset printing inks.

Particularly preferred binders are those which are based on renewable raw materials, such as alkyd resins, modified rosins, aromatic hydrocarbon resins, modified hydrocarbon resins and mixtures thereof.

Examples of suitable modified rosins are those modified with acrylic acid or maleic acid.

The amount of the binders in the offset printing inks of the invention is preferably in a range from 22 to 55 wt %, more preferably in a range from 24 to 50 wt %, and very preferably in a range from 28 to 43 wt %, based in each case on the overall offset printing ink.

Above an amount of 55 wt %, it is barely still possible to achieve the desired mirror effect. Below 22 wt % binder content, the film strength of the offset prints is too low.

The offset printing ink of the invention further comprises further additives such as, for example, dryers, waxes, film-forming assistants, antioxidants, dispersing assistants and mixtures thereof.

Dryers are usually catalysts for the crosslinking of the unsaturated bonds in the binders. They include, for example, manganese salts, cobalt salts or iron salts of fatty acids and mixtures thereof.

The effects of waxes include improving abrasion and scratch resistance of the printed surfaces.

Examples thereof are polyethylene waxes, candelilla wax, carnauba wax, microcrystalline wax, PTFE-waxes or mixtures thereof.

The offset printing ink of the invention may also comprise one or more antioxidants. By adding antioxidants it is possible in particular to prevent or at least reduce unwanted oxidation of unsaturated resin acids, resin acid esters and/or fatty acid esters present in the binder or binders.

The antioxidants are preferably selected from ascorbic acid, ascorbyl palmitate, ascorbyl stearate, isoascorbic acid, tocopherols, propyl, octyl and dodecyl gallate, tert-butylhydroquinone, butylhydroxyanisole, butylhydroxytoluene and mixtures thereof.

Dispersing assistants are surfactants whose pigment-affinity heads are adsorbed on the pigment, while the long chains protrude into the dispersing medium. Where two pigment particles encounter one another, their surfaces cannot remain adhering to one another, since they are kept at a distance by the surfactants. This steric stabilization prevents the formation of agglomerates and ensures homogeneous distribution of the individual pigments within the printing ink.

The chains projecting into the liquid phase also lower the surface tension and interface tension and so enable effective wetting of the pigment surface by the liquid phase.

The effectiveness of homogeneous distribution of metallic pigments in a printing ink is critical to the quality and stability of said ink.

Dispersing assistants of these kinds are generally added to the printing ink during formulation, in contrast to the leafing additives, which are added preferably to the metallic pigment paste, since in that way they are able to go particularly well onto the metallic pigment surface.

Examples of dispersing assistants are Disperbyk 108, Disperbyk 111 or Disperbyk 2200 from Byk Additives & Instruments.

In preferred embodiments, the offset printing ink is not admixed with any rheological additives, or with only a small amount (<1 wt %, preferably <0.3 wt %, based on the overall offset printing ink), since the very low viscosity according to the invention is set preferably only via the amount of solvent.

These further additives are present preferably in a quantitative range of 1-10 wt %, based on the total weight of the offset printing ink. Further preferred is a quantitative range of 2-8 wt %, and particularly preferred is a quantitative range of 3 to 5 wt %.

A further subject of the invention is a method for producing the offset printing ink of the invention. This method comprises the following steps:

a) providing an offset varnish by mixing and heating binders and solvents, b) providing a paste with PVD aluminum effect pigments which have an average thickness $h_{50}$ of 15 to 80 nm and are coated with a leafing additive, c) adding further solvents and optionally further additives to the varnish a) and carrying out mixing with the PVD aluminum pigment paste b)

d) setting the viscosity in a range from 4 to 15 Pa s, wherein the viscosity the set preferably by addition of solvent, and wherein the viscosity the measured on the sample conditioned at 25° C. using a rotational viscometer having a cone/plate geometry at a shear stress of 185.9 Pa, d) optionally ageing the offset printing ink until it has attained a viscosity in a range from 4.0 to 12 Pa s.

The production of an offset varnish by mixing and heating binders and solvents (step a)) is well known from the prior art.

PVD aluminum effect pigments are available commercially in the form of dispersions or pastes of low pigment content (about 5 up to maximum of 20 wt % pigmentation). A broad spectrum of different solvents is available here, as can be seen, for example, from the Metalure® series from Eckart America.

In providing a paste with PVD aluminum effect pigments, preference is given to using a paste or dispersion which comprises a solvent compatible with the offset printing ink, and/or a volatile solvent. Examples of such solvents are ethanol, ethyl acetate, isopropanol or acetone.

For the application of the additive, it is preferably first dissolved in a solvent compatible with the offset printing ink. With particular preference this solvent is one from the group of mineral oils, vegetable oils, fatty acid esters or mixtures thereof. For improved solubility, it is also possible to add small amounts (up to about 10 wt %, preferably up to 5 wt %) of a particularly good, volatile solvent. This solution is subsequently mixed with the aluminum pigment dispersion, and this mixture is homogenized. This can be done at room temperature, or else at elevated temperatures. In the course of homogenization, the leafing additive goes onto the pigment surface. As an optional measure it is possible subsequently to remove largely all of the volatile solvents from the pigment paste under reduced pressure. In this case up to about 2 wt %, preferably below 1 wt %, of the volatile solvent may remain in the dispersion.

In another method, the leafing additive may be used during the actual production of the PVD pigment. PVD pigments are produced by first coating a support strip made of polymeric film (usually PET) with what is called a release coat. This coating operation may be carried out inside or outside the ultra high vacuum chamber (U.S. Pat. No. 6,398,999 B1). Next, in an ultra high vacuum chamber, a thin aluminum film is applied to the release-coated support film. The film thus coated is subsequently transferred to a stripping chamber, which is no longer under ultra high vacuum. In this chamber, the film is dissolved in a suitable solvent (e.g., acetone), and the metal film applied by vapor deposition is partially detached and comminuted. Other following steps include concentration steps and steps of separation of pigment and residues of the dissolved release layer; customarily, complete separation is not achieved. The filter cake formed in this procedure is subsequently dispersed in the desired solvent. Targeted comminuting steps (e.g., using a dissolver) can be used to adjust the particle size of the platelet-shaped PVD aluminum pigments further toward the desired target values.

In one embodiment, then, it is possible to dissolve the leafing additive in the solvent of the stripping chamber itself, so that it goes straight onto the resultant aluminum pigments, as first described in EP 826745 A2. In this case the solvent used ought preferably to be a solvent which is likewise compatible with an offset printing ink. In another embodiment, the leafing additive may also be dissolved in the solvent that is to be used when processing the pigment filter cake.

In step c) the varnish is preferably first diluted by addition of further solvents. If the offset ink is to include further additives such as, for example dryers, waxes, film-forming assistants, antioxidants, dispersing assistants, and mixtures thereof, then these additives are added preferably to the diluted varnish. The addition thereof to the PVD aluminum effect pigment dispersion could be detrimental to the leafing properties of the effect pigment. The varnish is subsequently mixed with the effect pigment dispersion in a customary way. In this operation, preference is given to stirring.

The adjustment of the target viscosity is accomplished preferably merely by adding a sufficient amount of further solvent.

A further subject of the invention is a printed substrate with metallic specular gloss, comprising a) optionally a primer layer A, b) a layer B applied by offset printing using an offset printing ink as claimed in any of claims 1 to 11, applied where appropriate on the primer layer A, c) optionally the further color layers C.

Particular preference here is given to printed substrates with a primer, since in that case the mirror effects achievable are particularly good.

As the primer it is possible in principle to use both water-based systems and conventional systems. Preferred in this context are the conventional, solvent-borne primer systems, since they are generally more compatible with the offset printing ink of the invention.

The primer may also be pigmented with—for example—chromatic pigments. In an especially preferred embodiment, however, the primer is a translucent layer.

The primer may be painted onto the substrate or applied by printing methods. Thus, for example, the primer may be a protective varnish.

Substrates which can be used in accordance with the invention include all substrates customary in offset printing. Hence it is possible, for example, to print paper, cardboard (in bleached form and/or in coated form), polymeric films, glass, ceramic, or metal.

Preferred substrates are those based on paper or cardboard. This may involve recycled products or fresh fiber, or mixtures thereof.

A further subject of the invention is a method for producing a high-gloss metallic printed image on a substrate. This method comprises the following steps:

a) optionally applying a primer to the substrate, b) applying an offset printing ink of the invention to the primer layer or to the substrate, to form a high-gloss print layer B, c) optionally applying further color layers C to the layer B.

In the majority of cases, very good specular gloss effects can be produced simply by applying the offset printing ink of the invention to the substrate, in one step.

In preferred embodiments however, a primer is applied to the substrate as the first step a), before the application of the high-gloss print layer B. With this procedure it is possible to obtain particularly good mirror effects. On rough substrates, the primer evens out irregularities in the surface structure and therefore produces a smoother substructure, which is conducive to the formation of a mirror effect with the offset printing ink of the invention.

Application of a primer is likewise advisable when using highly absorbent substrates such as natural paper or uncoated paper or cardboard, for example. In that case the printing ink solvent may be partially absorbed by the substrate, which of course suddenly increases the viscosity in the print film. Accordingly, the platelet-shape aluminum pigments are less well able to take up a plane-parallel orientation with respect to the substrate.

In step B, the offset ink of the invention may be applied in one step or in a plurality of steps, two steps for example, to the substrate or to the primer. In the majority of cases, however, it is possible for the offset printing ink of the invention to be applied in one step. Layer B is applied only once in one printing operation.

Through the application of an additional overprint varnish, aqueous or UV curing, for example, the printed product becomes protected, from mechanical exposure, for example. Hence it is possible to provide outstanding abrasion and scratch resistance, for example.

In order to be able to achieve a variety of visual effects, techniques such as overlapping and overprinting with additional chromatic colors are employed in printing processes.

The printing method may be carried out as a sheet-fed offset or a web-fed offset process.

It has emerged, surprisingly, that further color layers C as well can be applied to the layer B without any loss of adhesion thereof.

In this case, print application may take place by means of an offset printing inking unit or a downstream flexographic inking unit inline in one print pass. This method is particularly cost-effective. Alternatively, the color layer C may also be applied by any other printing method in offline mode in a second print pass, after drying of the first print.

The further color layers C, preferably one (number 1) color layer C, may be transparent. This is the case if the printed image requires merely a silvery specular gloss effect, but the aluminum pigments can partially be wiped away. The overprinted layer C gives the print abrasion stability.

If, however, printing inks pigmented with chromatic pigments are used for the print layers C, extremely appealing print effects can be realized.

EXPERIMENTAL SECTION

I Production of Offset Printing Inks

Example 1

1a. Production of Varnish 1:

In accordance with the formula shown in table 1, the solvents of item 4 and item 5 were introduced and heated to 135° C. At this temperature, the resins of items 6, 7 and 8 were added to the mixture and heating was continued to 170° C. At this temperature, after a dissolution time of 15 minutes, items 9, 10, 11 and 12 were added. Following complete homogenization, the varnish was cooled to room temperature.

1b. Production of the Pigment Paste:

Item 2 was dissolved in item 3 and additionally 3% of ethyl acetate. Then item 1 (commercially available pigment dispersion Metalure® A-41510 (15 wt % dispersion of a PVD aluminum pigment in ethanol, $d_{50}=10$ μm, $h_{50}=25$ nm; from Eckart America; the amount of Metalure® reported in table 1 refers to the pure aluminum content of the dispersion) was added and homogenization took place with stirring. As a final step, the ethyl acetate and ethanol solvents were evaporated off under reduced pressure.

1c. Offset Printing Ink:

Items 13 and 14 were added to and dispersed in the varnish 1 produced in the first step.

Following addition of the pigment paste produced in step 2, homogenization was repeated with stirring.

1d. Adjustment to Print Viscosity:

The print viscosity was adjusted, lastly, using the vegetable oil Estisol 312. The viscosity was measured using a rotational viscometer (model: Bohlin CVO 100, from Malvern Instruments) with a cone/plate geometry (cone inclination angle: 4°, cone diameter: 40 mm).

In this case the sample for measurement was conditioned at 25° C. and the measurement program was set so that the shear stress was varied in a range from 11.6 to 744.1 Pa. The viscosity value used here was the value at a shear stress of 185.9 Pa.

TABLE 1

Formula constituents, example 1:

| Constituent of formula | Item | Amount introduced [Wt %] | Ingredient trade name | Manufacturer | Formula constituent | Ingredient description |
|---|---|---|---|---|---|---|
| Metallic pigment paste | 1 | 5.4405 | Metalure ® A-41510 | Eckart America | PVD aluminum pigment dispersion | Aluminum |
| | 2 | 1.0881 | stearic acid | HEMA GmbH & Co. KG | Leafing additive | Stearic acid |
| | 3 | 5.1714 | PKWF 28/31 AF new | Haltermann | Solvent | Mineral oil, aromatic-free, boiling range 280-310° C. |
| Varnish 1 | 4 | 9.23 | PKWF 28/31 | Haltermann | Solvent | Mineral oil, boiling range 280-310° C. |
| | 5 | 5.68 | Tung oil | HEMA GmbH & Co. KG | Solvent | Tung oil |
| | 6 | 9.94 | Setaprint ™ 1856 E | Lawter | Resin | Phenol-modified rosin |
| | 7 | 7.1 | Worlée Petroleum resin SK-150 | Worleé | Resin | Aromatic hydrocarbon resin; petroleum resin; modified HC resin |
| | 8 | 15.62 | Novarez TA 120 | Rütgers | Resin | Phenol-modified HC resin |
| | 9 | 8.52 | SYNTHALA T D 272 | Synthopol | Resin | Alkyd resin |
| | 10 | 11.005 | PKWF 28/31 | Haltermann | Solvent | Mineral oil, boiling range 280-310° C. |
| | 11 | 2.13 | OPTIFILM ENHANCER 300 | Eastman | Film-forming assistant | |
| | 12 | 0.71 | PKWF 28/31 | Haltermann | Solvent | Mineral oil, boiling range 280-310° C. |
| Offset printing ink | 13 | 0.65 | Borchers Dry 0411HS | OMG Group | Dryer | Manganese carboxylate in solution in fatty acid ester |
| | 14 | 17.715 | Estisol 312 | Easti Chem A/S | Solvent | Fatty acid ester |
| | Total: | 100 | | | | |

Example 2

2a. Production of Varnish 2:

In accordance with the formula shown in table 2, items 4 to 8 were mixed and heated to 170° C. After a boiling time of 15 minutes, the mixture was cooled to 150° C. and then items 9 to 10 were added and the mixture was homogenized. The varnish could then be cooled to room temperature.

2b. Production of Pigment Paste:

The procedure of example 1 was repeated, but with the quantities of the ingredient shown in table 2.

2c. Offset Printing Ink:

Items 11, 12, 13 and 14 were added to and dispersed in the varnish 1 produced in the first step. Following addition of the pigment paste produced in step 2, homogenization was repeated, with stirring.

2d. Adjustment to Print Viscosity:

The print viscosity, lastly, was adjusted using the mineral oil. The measurement was made as described in example 1.

TABLE 2

Formula constituents, example 2:

| Constituent of formula | Item | Amount introduced [Wt %] | Ingredient trade name | Manufacturer | Formula constituent | Ingredient description |
|---|---|---|---|---|---|---|
| Metallic pigment paste | 1 | 8.132 | PKWF 28/31 AF | Haltermann | Solvent | Mineral oil Aromatic-free Boiling range 280-310° C. |
| | 2 | 5.6544 | Metalure ® A41506 | Eckart America | Pigment | Aluminum pigment dispersion |
| | 3 | 1.4136 | RHODAFAC Lauryl-phosphonic acid | Rhodia | Leafing additive | Laurylphosphonic acid |
| Varnish 2 | 4 | 7 | PKWF 28/31 | Haltermann | Solvent | Mineral oil, boiling range 280-310° C. |
| | 5 | 24.99 | Petroleum resin SK-150 | Worleé | Resin | Aromatic modified hydrocarbon resin |
| | 6 | 4.2 | ALPHA-REZ 4700 E KS04 | Hexion | Resin | Phenol-modified rosin/HC hybrid resin |

TABLE 2-continued

Formula constituents, example 2:

| Constituent of formula | Item | Amount introduced [Wt %] | Ingredient trade name | Manufacturer | Formula constituent | Ingredient description |
|---|---|---|---|---|---|---|
| | 7 | 7 | Novarez TA 120 | Rütgers | Resin | Phenol-modified HC resin |
| | 8 | 7 | Tung oil | HEMA GmbH & Co. KG | Solvent | Tung oil |
| | 9 | 7 | SYNTHALAT D 272 | Synthopol | Resin | Alkyd resin |
| | 10 | 12.25 | PKWF 28/31 | Haltermann | Solvent | Mineral oil, boiling range 280-310° C. |
| Offset printing ink | 11 | 5 | Worleékyd S23 | Worleé | Resin | Alkyd resin |
| | 12 | 0.5 | Borchers Dry 0411HS | OMG Group | Dryer | Manganese carboxylated solution in fatty acid ester |
| | 13 | 2.5 | Minerpol 221 | BYK | Wax | |
| | 14 | 7.36 | PKWF 28/31 AF new | Haltermann | Solvent | Mineral oil Aromatic-free Boiling range 280-310° C. |
| | Total: | 100 | | | | |

Further inventive examples and also comparative examples were produced in accordance with the procedure of example 1 or 2, with variation of certain ingredients. Details of this can be found in tables 4 and 5. Also listed therein are the viscosities measured immediately after the preparation of the offset printing ink and also after a storage time of four weeks at room temperature (RT). The offset printing inks of the invention typically exhibit a drop in viscosity after a certain storage time.

As a further varnish 3, a low-migration and low-odor varnish was used, its composition being set out in table 4.

example 3, a PVD aluminum pigment dispersion (W-520121L), was used which still contains significant residues of a release coat. This pigment was not treated with a leafing additive. The residues of the release coat produce a nonleafing effect. Comparative examples 4, 5 and 6 and also inventive examples 12 to 14 formed an experimental series, with the same fundamental composition, where the viscosity was varied only via the concentration of solvent.

Additionally, the printing inks of inventive example 6 were printed on a wide variety of different substrates. The results are set out in table 7.

TABLE 3

Formula, varnish 3

| Constituent of formula | Item | Amount introduced [Wt %] | Ingredient trade name | Manufacturer | Formula constituent | Ingredient description |
|---|---|---|---|---|---|---|
| Varnish 3 | 1 | 53.02 | Texaprint SPOC | Cognis | Solvent | Fatty acid ester, pentaerythritol tetraoctanoate |
| | 2 | 25.12 | Setaprint 3450E | Lawter | Resin | Phenol-modified rosin |
| | 3 | 10.22 | Jonrez IM 816 | WestRock | Resin | Malein-modified rosin |
| | 4 | 6.98 | Kristalex F100 | Eastman | Resin | Hydrocarbon resin |
| | 5 | 4.66 | Texaprint SPOC | Cognis | Solvent | Fatty acid ester, pentaerythritol tetraoctanoate |
| | Total: | 100 | | | | |

Inventive examples are set out in table 4. In the case of example 8, the PVD aluminum effect pigment, instead of step 1.b from example 1, was dispersed in ethanol and, following addition of tetraethoxysilane, water, and ammonia as catalyst, was coated with $SiO_2$ in a conventional way by means of a sol-gel process. This was followed by addition of Dynasilan 9116 (C16 alkyl silane) as leafing additive (3 wt % based on aluminum pigment). The $SiO_2$ content of the coated pigment was 10 wt %.

Table 6 contains comparative examples. In the case of comparative examples 1 and 2, a very thin aluminum pigment produced by wet milling was employed instead of a PVD aluminum effect pigment. In the case of comparative II Production of the Proof Prints and Optical Characterization Thereof II.1 Preparation of Proof Prints Using Prüfbau MZ II Multipurpose Sample Printing Machine (Prüfbau, model: MZ II)

A Proof printing of the metallic printing ink without primer

Preparation:

The substrate was adhered to the printing sample carrier and the pressure applied by the printing units was adjusted to 600 N. The drive rolls were set to a temperature of 23° C.

Procedure:

300 mg of the ink were applied to the first field of the inking roll. The ink was distributed over the two rotating drive rolls by placement onto these rolls. After 30 seconds, the rubber blanket printing form was placed onto the inking roll and was then inked over the course of 60 seconds.

For the printing operation, the rubber blanket printing form was subsequently fitted onto its dedicated mount on the printing mechanism 1, and the print sample carrier with the substrate was placed into its dedicated track. The printing experiment took place with a printing speed of 0.5 m/s.

For all the experiments of inventive examples 1 to 13 and of comparative examples 1 to 9 (see tables 4 and 5), the substrates used were label paper (Profigloss illustration printing 100 g/m$^2$).

B Proof Printing of the Primer and of the Metallic Ink

Preparation took place as under A.

Procedure:

200 mg of the primer were applied to the first field of the inking roll, and 300 mg of the ink were applied to the second field of the inking roll.

The inking roll was then placed onto the two drive rolls, and these rolls were set in rotation by actuation of the starting lever. The primer and the ink were then distributed over the three rolls. After a rub-in time of 30 seconds, the rubber blanket printing forms were placed onto the inking roll and inked over the course of 60 seconds.

For the printing operation, the two rubber blanket printing forms were then fitted onto their dedicated mount on the two printing mechanisms—the printing form with primer to the printing mechanism 1, and the printing form with ink to the printing mechanism 2—and the print sample carrier with the substrate was placed into its dedicated track, and the specimen print was produced (printing speed: 0.5 m/s).

Two different primers were used for the various experiments:

Primer 1: Huber group Lack TD Spez. 877894 (water-based primer)

Primer 2: Huber group Inkredible CRS MAX transparent white 40N0550

II.2 Gloss Measurements

The gloss measurements of the proof prints were carried out using a micro-TRI-gloss (from Byk-Gardner). The measurements took place at a gloss angle of 60°. Measurement was carried out at five different locations on the proof print. The values recorded in table 4 are the average values formed from these measurements.

II. 3 Determination of the Color Density of the Proof Print Using the SpectroDens Instrument (from TECHKON)

The spectro-densitometer possesses four CMYK color filters. The color density values were measured for all four color filters in one measurement. Metallic inks in the silver shade were measured using the value for the color filter C. The measurement was repeated on at least three locations on the sample, and the average value was used in each case. Calibration to paper white took place on the unprinted substrate used.

II.4 Determination of the Luster Value Using the X-Rite SP64 Colorimeter

The proportional difference between scattered light and total reflection is a measure of the visual assessment of brightness, distinctness of image, and milkiness of the mirror effect.

The colorimeter has a sphere geometry and a gloss trap, allowing measurement of the variables SPEX and SPIN.

The SPIN value here indicates the total amount of reflecting light in all spatial directions in accordance with the sphere geometry, whereas for the SPEX measurement the gloss trap is engaged and only the remaining scattered light is measured. The difference between the two values produces the value known as luster. This is a measure of the proportion of irradiated light which is reflected in the total reflection and therefore represents the effect of a mirror. The higher, therefore, the luster (and therefore: the lower the SPEX value and the higher the SPIN value), the more clear the mirror effect is and hence the more clear the distinctness of image is.

For calibration, a black-and-white adjustment was carried out. The SPIN and the SPEX values were measured at five locations each on the proof print, and the average value was formed therefrom. The proof prints B with primer were subjected to measurement.

II.5 Visual Assessment

It was found that the various numerical parameters from the measurements were not always able to reproduce the overall impression to the human eye. Additionally, therefore, for the variables measured, the overall visual impression conveyed by the proof prints in terms of the mirror effect was assessed on the basis of a rating system (rating 1: very good, rating 2: good, rating 3: satisfactory, rating 4: no longer sufficient, rating 5: deficient).

TABLE 4

Formula constituents, viscosities and optical data for inventive examples

| | | Examples | | | | | |
|---|---|---|---|---|---|---|---|
| | | Example 1 | Example 2 | Example 3 | Example 4 | Example 5 | Example 6 |
| Metallic pigment paste | Pigment base | A-41510EN | A-41510EN | A-41510EN | A-41510EN | A-41510EN | A-41510EN |
| | Pigment content | 5.4% | 5.1% | 5.4% | 5.4% | 3.0% | 5.4 |
| | Leafing additive (Amount based on metallic pigment) | 20% Stearic acid | 25% MDST | 25% MDST | 25% MDST | 25% MDST | 20% MDST |

TABLE 4-continued

Formula constituents, viscosities and optical data for inventive examples

| Offset printing ink constituents | Solvent | Mineral oil/ Estisol 312/ Tung oil | Mineral oil/Tung oil | Mineral oil/ Estisol 312/ Tung oil | Mineral oil/IPL/ Tung oil | Mineral oil/ Tung oil | Mineral oil/ Estisol 312/ Tung oil |
|---|---|---|---|---|---|---|---|
| | Solvent content | 47% | 56% | 50% | 51% | 48% | 48% |
| | Varnish used | Varnish 1 | Varnish 2 | Varnish 1 | Varnish 1 | Varnish 2 | Varnish 1 |
| | Total resin content | 42% | 36% | 39% | 42% | 41% | 40% |
| Viscosities | Viscosity: | 10.4 Pa s | 5.2 Pa s | 9.2 Pa s | 9.1 Pa s | 5.3 Pa s | 13.7 Pa s |
| | Viscosity after 4 weeks RT | 7.8 Pa s | 4.4 Pa s | 6.3 Pa s | 5.9 Pa s | 4.3 Pa s | 8.5 Pa s |

| | | Examples | | | | |
|---|---|---|---|---|---|---|
| | | Example 7 | Example 8 | Example 9 | Example 10 | Example 11 |
| Metallic pigment paste | Pigment base | A-41510EN | A-41510EN | A-41510EN | A-41510EN | A-41510EN |
| | Pigment content | 5.4% | 5.4% | 5.4% | 5.4% | 5.4% |
| | Leafing additive (Amount based on metallic pigment) | 20% Hostaphat CC100 | 10% SiO$_2$; 9116; | 20% Hostaphat CC100 | 25% Stearic acid | 25% MDST |
| Offset printing ink constituents | Solvent | PTO | PTO | Mineral oil/PTO | Mineral oil/ Estisol 312/ Tung oil | Mineral oil/Tung oil |
| | Solvent content | 70% | 67% | 68% | 47% | 58% |
| | Varnish used | Varnish 3 | Varnish 3 | Varnish 3 | Varnish 1 | Varnish 1 |
| | Total resin content | 24 | 26 | 26 | 42% | 34% |
| Viscosities | Viscosity: | 9.9 Pa s | 10.0 Pa s | 10.0 Pa s | 10.7 Pa s | 10.0 Pa s |
| | Viscosity after 4 weeks RT | 7.6 Pa s | 7.4 Pa s | 7.8 Pa s | 8.1 Pa s | 9.0 Pa s |

TABLE 5

Optical assessment and measurements of proof prints of the inventive examples

| | | Example | | | | | | | | | | |
|---|---|---|---|---|---|---|---|---|---|---|---|---|
| | | Example 1 | Example 2 | Example 3 | Example 4 | Example 5 | Example 6 | Example 7 | Example 8 | Example 9 | Example 10 | Example 11 |
| Proof prints + optical characterization | Gloss 60° Proof print A | 226 | 226 | 257 | 269 | 271 | 208 | 244 | 208 | 240 | 194 | 120 |
| | Optical density A | 1.7 | 1.35 | 1.35 | 1.36 | 0.95 | 1.5 | 1.4 | 1.2 | 1.4 | 1.6 | 0.8 |
| | Primer used | Primer 2 | Primer 1 | Primer 2 | Primer 2 | Primer 1 | Primer 2 | Primer 2 | Primer 2 | Primer 2 | Primer 2 | Primer 2 |
| | Gloss 60° Proof print B | 213 | 315 | 332 | 318 | 307 | 274 | 264 | 230 | 281 | 194 | 328 |
| | Optical density Proof print B | 1.6 | 1.5 | 1.5 | 1.5 | 1.1 | 1.7 | 1.5 | 1.4 | 1.5 | 1.6 | 1.6 |
| | Proof print B: SPIN [%] | 60.3 | 64.5 | 62.5 | 65.2 | 64.9 | 61.6 | 65.0 | 63.2 | 65.3 | 57.2 | 62.7 |
| | Proof print B: SPEX [%] | 39.7 | 35.5 | 37.5 | 34.8 | 35.1 | 38.4 | 35.0 | 36.8 | 34.7 | 42.8 | 37.3 |

TABLE 5-continued

Optical assessment and measurements of proof prints of the inventive examples

| | Example | | | | | | | | | | |
|---|---|---|---|---|---|---|---|---|---|---|---|
| | Example 1 | Example 2 | Example 3 | Example 4 | Example 5 | Example 6 | Example 7 | Example 8 | Example 9 | Example 10 | Example 11 |
| Proof print B: Luster [%] | 20.6 | 29.0 | 24.6 | 30.3 | 29.7 | 23.2 | 29.9 | 26.4 | 30.7 | 14.4 | 25.4 |
| Distinctness of image, visual | 2− | 3− | 1 | 1 | 3 | 1− | 3 | 3 | 2 | 2− | 1 |

III Interpretation

III.1 Inventive Examples (Tables 4 and 5)

The best inventive examples prove to be examples 3, 4, 11 and 6. For all of the examples, decidedly high optical densities and high gloss values were observed in the proof print B. The luster value did not always correlate with the visual assessments of the specular gloss effect. The experiments rated the lowest visually were examples 2 and 5. With these experiments, the primer used was a water-based primer, which was evidently less compatible with the offset printing ink of the invention than the conventional primer 1. Examples 7 and 8, likewise evaluated visually with a rating of 3, were formulated with varnish 3, which had a very high solvent content and a very low binder content. This nonideally balanced binder/solvent ratio may adversely influence the orientation of the aluminum pigments and therefore the development of gloss already. In the case of example 5, the relatively low visual assessment is probably attributable in particular to the low optical density. This in turn may be attributable primarily to the relatively low aluminum pigment concentration. High gloss and luster values were measured for this sample, admittedly, but the poorer optical density is manifested in the overall optical impression.

The specular gloss of all inventive examples, however, was at a high level hitherto unachieved in conventional offset printing inks with metallic pigmentation.

III.2 Comparative Examples (Table 6)

The two first comparative examples used a wet-milled aluminum pigment rather than a PVD pigment (PLATIN-VARIO AE-82001 from Eckart GmbH). The gloss and luster values and also the visual assessment turned out drastically poorer than for all of the inventive examples with PVD pigments. Similarly poor results were obtained for comparative example 3 with a nonleafing PVD pigment.

When the viscosity was varied, a drop in the mirror effect (gloss and luster values and also the visual assessment) became apparent as the viscosity went up. The highest values were received by comparative example 4. In the case of this low-viscosity printing ink (viscosity: 2.2 Pa s), however, there is already unwanted "misting" apparent. The smear resistance and dot definition in the case of fine detail elements was also apparent.

In the case of comparative examples 5 and 6, in spite of gloss and luster values that were still relatively good in the measurements, it was clearly apparent that the distinctness of image was no longer sufficient as a result of a significantly increasing milkiness of the mirror, and hence that the mirror effect was no longer sufficient for the status of inventive examples. The high viscosities appear here to prevent optimum orientation of the platelet-shaped aluminum pigments in the proof print.

III.3 Variation of the Substrates

Testing took place on various paper and cardboard substrates.

The paper substrates were relatively comparable grades, produced from virgin fiber, bleached and coated.

In the case of the cardboard substrates, the grades used range from recycled to bleached virgin fiber cardboard. The experiments with bleached, coated virgin fiber cardboard are of higher optical grade from left to right, since in terms of their surface structure they become smoother and on the other hand the solvent can be absorbed, and oxidated drying takes place in a well-balanced proportion. This leads to good orientation of the aluminum pigments. The printing experiment on the highest-quality substrate (Chromalux) resulted in an extremely good specular gloss, which was hitherto unachieved in this pronounced form in offset printing.

The substrates that were the least suitable on account of their very rough surface structures (virgin fiber: Sappi GZ; Recycled: Mayr-Melnhof Mirabell) produced an unexpectedly surprising metallic effect. While the distinctness of image is attenuated by the surface structure on increasing distance from the printed object, there is nevertheless a diffuse, nonmilky mirror produced. Accordingly, a hitherto unachieved, surprising metallic effect can be obtained which was not achievable on these substrates before. In this case, the rough structure of the substrate was still visible, but receives a hitherto unknown printed optical effect by virtue of the metallic pigment printing with the printing ink of the invention.

TABLE 6

Formula constituents, viscosities and optical data for comparative examples and viscosity variation

| | Wet-milled Al pigments | | Non-leafing | | Viscosity variation experimental series Example/comparative example | | | | |
|---|---|---|---|---|---|---|---|---|---|
| | Comparative example 1 | Comparative example 2 | Comparative example 3 | Comparative example 4 | Example 12 | Example 13 | Example 14 | Comparative example 5 | Comparative example 6 |
| Pigment base | PLATIN-VARIO AE-82001 (Eckart GmbH) | PLATIN-VARIO AE-82001 | W-52012IL* | A-41510EN | A-41510EN | A-41510EN | A-41510EN | A-41510EN | A-41510EN |
| Pigment content [%] | 5.4 | 5.4 | 5.2 | 5.7 | 6.1 | 6.4 | 6.5 | 6.9 | 7.1 |
| Leafing additive | 25% MDST | 20% MDST | | 25% MDST | 25% MDST | 25% MDST | 25% MDST | 25% MDST | 25% MDST |
| Solvent | Mineral oil/Estisol 312/Tung oil | Mineral oil/Estisol 312/Tung oil | PTO/Tung oil | Mineral oil/Tung oil | Mineral oil/Tung oil | Mineral oil/Tung oil | Mineral oil/Tung oil | Mineral oil/Tung oil | Mineral oil/Tung oil |
| Solvent content | 44 | 44 | 65 | 52 | 48 | 45 | 44 | 41 | 39 |
| Resin composition | Varnish 1 | Varnish 1 | Varnish 3 | Varnish 2 | Varnish 2 | Varnish 2 | Varnish 2 | Varnish 2 | Varnish 2 |
| Total resin content | 42 | 42 | 29 | 32 | 34 | 35 | 36 | 38 | 48 |
| Viscosity: | 11.7 Pa s | 11.7 Pa s | 11 Pa s | 2.2 Pa s | 5.5 Pa s | 8.1 Pa s | 11.4 Pa s | 21.4 Pa s | 34.5 Pa s |
| Gloss 60° | 101 | 112 | 53 | 179 | 157 | 171 | 163 | 154 | 141 |
| Optical density | 1.1 | 1.1 | 0.9 | 1.6 | 1.2 | 1.2 | 1.3 | 1.3 | 1.3 |
| Primer | Primer 2 | Primer 2 | Primer 2 | Primer 2 | Primer 2 | Primer 2 | Primer 2 | Primer 2 | Primer 2 |
| Gloss 60° on Primer | 121 | 121 | 81 | 311 | 309 | 296 | 277 | 221 | 190 |
| Optical density on Primer | 1.25 | 1.2 | 0.8 | 1.9 | 1.9 | 1.9 | 1.8 | 1.65 | 1.6 |
| SPIN with Primer [%] | 55.8 | 55.88 | 57.3 | 66.5 | 66.2 | 65.6 | 65.5 | 61.5 | 60.7 |
| SPEX with Primer [%] | 44.2 | 44.12 | 42.7 | 33.5 | 33.8 | 34.4 | 34.6 | 38.5 | 39.3 |
| Luster with Primer [%] | 11.6 | 11.76 | 14.6 | 33.0 | 32.4 | 31.2 | 30.9 | 23.0 | 21.3 |
| Distinctness of image, visual | 5 | 5 | 5 | 1 | 1− | 2 | 3 | 4 | 4− |

TABLE 7

Printing ink as per example 6 printed onto a variety of substrates

| | Bleached virgin fiber, coated | | | Recycled cardboard, double coating | Virgin fiber cardboard, bleached, coated | | | |
|---|---|---|---|---|---|---|---|---|
| | Profigloss | Perfect B | | Mayr-Melnhof | | | | |
| Optical assessment/substrate | Bilderdruck 100 g/m² | Super 75 g/m² | WSHG 5 | Mirabell GD2 300 g/m² | Sappi GZ 280 g/m² | Invercote T 240 g/m² | Truecard Ice 300 g/m² | Chromalux |
| Gloss 60° Proof print A | 208 | 186 | 183 | 175 | 191 | 259 | 171 | 228 |
| Optical density Proof print A | 1.5 | 1.2 | 1.1 | 1.5 | 1.6 | 1.6 | 1.1 | 1.1 |
| Gloss 60° Proof print B | 274 | 233 | 263 | 200 | 186 | 232 | 247 | 238 |
| Optical density Proof print AB | 1.7 | 1.6 | 1.7 | 1.6 | 1.7 | 1.7 | 1.7 | 1.5 |
| Proof print B: SPIN (%) | 61.59 | 61.76 | 62.2 | 60.47 | 61.43 | 62.11 | 63.39 | 62.93 |
| Proof print B: SPEX (%) | 38.41 | 38.24 | 37.8 | 39.53 | 38.57 | 37.89 | 36.61 | 37.07 |
| Proof print B: Luster with Primer (%) | 23.18 | 23.52 | 24.4 | 20.94 | 22.86 | 24.22 | 26.78 | 25.86 |
| Proof print B: Mirror effect, visual | 1− | 2 | 1− | 3 | 3 | 2 | 1 | 1+ |

The invention claimed is:

1. An offset printing ink comprising platelet-shaped aluminum pigments having an average thickness $h_{50}$ from a range from 15 to 80 nm, and also binders and solvents, wherein the platelet-shaped aluminum pigments are produced by PVD methods and are coated at least partly with a leafing additive, and in that the offset printing ink has a viscosity of 4 to 15 Pa s, measured on a sample conditioned at 25° C., using a rotational viscometer having a cone/plate geometry at a shear stress of 185.9 Pa;

wherein the solvent is selected from the group consisting of mineral oils, vegetable oils, and fatty acid esters, or mixtures thereof, the vegetable oils not being used without at least one of the other two solvents and wherein the solvent content is in a range of 40-72 wt%, based on the overall offset printing ink.

2. The offset printing ink as claimed claim 1, wherein the viscosity is in a range from 4.1 to 12 Pa s.

3. The offset printing ink as claimed in claim 1, wherein the viscosity is in a range from 4.0 to 9.2 Pa s.

4. The offset printing ink as claimed in claim 1, wherein the leafing additive is a phosphorus-containing organic compound which is
   a) phosphoric acids or phosphoric esters having the general formula (I)

$$(O)P(OR^1)(OR^2)(OR^3) \qquad (I)$$

and/or
   b) phosphonic acids or phosphonic esters of the general formula (II)

$$(O)PR^4(OR^1)(OR^2) \qquad (II)$$

and/or
   c) phosphinic acid or phosphinic esters of the general formula (III)

$$(O)PR^4R^5(OR^1) \qquad (III)$$

wherein
   $R^1$, $R^2$ and $R^3$ independently of one another is H or a branched or unbranched alkyl, aryl, alkylaryl or arylalkyl group having 1 to 30 carbon atoms and optionally containing heteroatoms such as O, S, and/or N, with the proviso that in the case of a compound of the formula (I), at least one of these radicals is a branched or unbranched alkyl, aryl, alkylaryl or arylalkyl group having 8 to 30 carbon atoms,
   $R^4$ and $R^5$ independently of one another is a branched or unbranched alkyl, aryl, alkylaryl or arylalkyl group having 8 to 30 carbon atoms and optionally containing heteroatoms such as O, S, and/or N,
   or
   is a compound of the general formula (IV)

$$R^6-X \qquad (IV)$$

wherein $R^6$ is an aliphatic alkyl radical having 12 to 30 carbon atoms and wherein X is a carboxyl group or a carboxylate group, an amino group or a trialkoxysilane.

5. The offset printed ink as claimed in claim 4, wherein $R^6$ is unbranched.

6. The offset printing ink as claimed in claim 4, wherein for the leafing additive $R^4$, $R^5$ and $R^6$ independently of one another is a branched or unbranched alkyl, aryl, alkylaryl or arylalkyl group having 14 to 20 carbon atoms.

7. The offset printing ink as claimed in claim 4, wherein the leafing additive
   i) is a phosphonic acid, where $R^1=R^2=H$ and $R^4$ is a branched or unbranched alkyl, aryl, alkylaryl, or arylalkyl group having 8 to 18 carbon atoms or
   ii) is a phosphoric ester, wherein at least one of the radicals $R^1$, $R^2$ and $R^3$ is a branched or unbranched alkyl group having 8 to 18 carbon atoms; or
   iii) is selected from the group consisting of stearic acid, ammonium stearate, alkali metal stearate, alkaline earth metal stearate or mixtures thereof.

8. The offset printing ink as claimed in claim 1, wherein the level of pigmentation of the aluminum pigment is 2 to 8 wt % based on the overall weight of the offset printing ink.

9. The offset printing ink as claimed in claim 8, wherein the level of pigmentation of the aluminum pigment is 2.5 to 6 wt % based on the overall weight of the offset printing ink.

10. The offset printing ink as claimed in claim 1, wherein the binder is selected from the group consisting of alkyd resins, modified rosins, maleate resins, aromatic hydrocarbon resins, modified hydrocarbon resins, allyl esters of polybasic organic acids, polyallyl ethers and mixtures thereof.

11. The offset printing ink as claimed in claim 1, wherein the offset printing ink comprises further additives selected from the group consisting of dryers, waxes, film-forming assistants, dispersing assistants, antioxidants and mixtures thereof.

12. The offset printing ink as claimed in claim 1, wherein the average sizes $d_{50}$ of the PVD aluminum effect pigments are in a range from 4 to 15 μm.

13. A method for producing an offset printing ink as claimed in claim 1, wherein the method comprises the following steps:
    a) providing an offset varnish by mixing and heating binders and solvents,
    b) providing a paste with PVD aluminum effect pigments which have an average thickness $h_{50}$ of 15 to 80 nm and are coated with a leafing additive,
    c) adding at least one further solvent and optionally further additives to the varnish a) and carrying out mixing with the PVD aluminum pigment paste b)
    d) setting the viscosity in a range from 4 to 15 Pa s and wherein the viscosity is measured on the sample conditioned at 25° C. using a rotational viscometer having a cone/plate geometry at a shear stress of 185.9 Pa,
    d) optionally ageing the offset printing ink until it has attained a viscosity in a range from 4.0 to 12 Pa s;
    wherein the at least one solvent is selected from the group consisting of mineral oils, vegetable oils, and fatty acid esters, or mixtures thereof, the vegetable oils not being used without at least one of the other two solvents.

14. A method according to claim 13, wherein the viscosity is set by addition of solvent.

15. A printed substrate with metallic specular gloss, comprising
    a) optionally a primer layer A,
    b) a layer B applied by offset printing using an offset printing ink as claimed in claim 1, applied where appropriate on the primer layer A,
    c) optionally the further color layers C.

16. The printed substrate with metallic specular gloss as claimed in claim 15, wherein a primer layer is applied on the substrate.

17. The printed substrate with metallic specular gloss as claimed in claim 15, wherein the primer is a translucent layer.

18. The printed substrate with metallic specular gloss as claimed in claim 15, wherein a further color layer C is applied which is transparent or comprises chromatic pigments.

19. A method for producing a printed substrate with metallic specular gloss, comprising the following steps:
    a) optionally applying a primer to a substrate,
    b) applying an offset printing ink to the primer layer or to the substrate, to form a high-gloss print layer B,
    c) optionally applying further color layers C to the layer B,
    the offset printing ink comprising:
    an offset printing ink comprising platelet-shaped aluminum pigments having an average thickness $h_{50}$ from a range from 15 to 80 nm, and also binders and solvents, wherein the platelet-shaped aluminum pigments are produced by PVD methods and are coated at least partly with a leafing additive, and in that the offset printing ink has a viscosity of 4 to 15 Pa s, measured on a sample conditioned at 25° C., using a rotational viscometer having a cone/plate geometry at a shear stress of 185.9 Pa;

wherein the solvent is selected from the group consisting of mineral oils, vegetable oils, and fatty acid esters, or mixtures thereof, the vegetable oils not being used without at least one of the other two solvents and wherein the solvent content is in a range of 40-72 wt%, based on the overall offset printing ink.

20. The method for producing a printed substrate with metallic specular gloss as claimed in claim 19, comprising applying a primer to the substrate.

21. The method as claimed in claim 19, wherein the layer B is applied only once in one printing procedure.

22. The method for producing a high-gloss metallic printed image as claimed in claim 19, wherein the color layer C is applied in a first printing by printing in line in one pass using an offset printing inking unit or a subsequent flexographic inking unit, or in that the color layer C is alternatively applied by any other printing method in offline mode in a second pass after drying of the first printing.

* * * * *